United States Patent [19]
Kono

[11] Patent Number: 5,695,405
[45] Date of Patent: Dec. 9, 1997

[54] ROLLER BEARING FOR CROSS JOINTS WITH UNIQUE GREASE HOLDING GROOVES

[75] Inventor: Shingo Kono, Iwata, Japan

[73] Assignee: NTN Corporation, Osaka, Japan

[21] Appl. No.: 619,359

[22] Filed: Mar. 21, 1996

[30] Foreign Application Priority Data

Mar. 29, 1995 [JP] Japan ...................... 7-071491

[51] Int. Cl.$^6$ .................................. F16D 3/41
[52] U.S. Cl. ............................ 464/128; 464/136
[58] Field of Search ................ 464/13, 14, 128, 464/130, 131, 905, 112, 136; 384/121, 123, 126, 127, 291, 368, 371, 420, 425

[56] References Cited

U.S. PATENT DOCUMENTS 3,070,980  1/1963  Slaght ........................ 464/14

FOREIGN PATENT DOCUMENTS

| 59-1890 | 1/1984 | Japan. |
| 62-23169 | 5/1987 | Japan. |
| 1290006 | 9/1972 | United Kingdom ............ 464/14 |

*Primary Examiner*—Daniel P. Stodola
*Assistant Examiner*—Gregory J. Strimbu
*Attorney, Agent, or Firm*—Nikaido, Marmelstein, Murray & Oram LLP

[57] ABSTRACT

The annular contact surface ($1b1$) of the bottom portion of an outer ring is formed with an uneven pattern comprising a number of projections (A) (regions A1, A2, A3) and recesses (regions B1, B2). Each projection (A) is a substantially Y-shaped region having a given level above the bottom surface of the regions (B1, B2). The regions (A1) and (A2), forming the Y's heads of the projection (A), lead to the outer diameter of the annular contact surface ($1b1$), while the region (A3) forming the Y's leg leads to the inner diameter of the annular contact surface ($1b1$).

6 Claims, 6 Drawing Sheets

| RADIAL REGION | r1~r2 | r2~r3 | r3~r4 | r4~r5 | r5~r6 |
|---|---|---|---|---|---|
| THE PERCENTAGE CONTACT AREA (%) | 41% | 51% | 48% | 42% | 37% | r1: THE INNER DIAMETER OF THE ANNULAR CONTACT SURFACE
r6: THE OUTER DIAMETER OF THE ANNULAR CONTACT SURFACE

| RADIAL REGION | r1~r2 | r2~r3 | r3~r4 | r4~r5 | r5~r6 |
|---|---|---|---|---|---|
| THE PERCENTAGE CONTACT AREA (%) | 44% | 34% | 31% | 40% | 46% |

FIG. 8

PRIOR ART

ROLLER BEARING FOR CROSS JOINTS WITH UNIQUE GREASE HOLDING GROOVES

BACKGROUND OF THE INVENTION

The present intention relates to a roller bearing interposed between a shaft portion of a spider and a yoke in a cross joint for connecting the propeller shaft or the like of an automobile.

In a front-engine rear-drive automobile or the like, usually the engine, clutch and transmission are concentrated in the front while the speed reduction gear unit and driving shaft are concentrated in the rear, with the result that use is made of a propeller shaft for power transmission therebetween. For the reason of the vehicle body construction, the propeller shaft is connected at an angle θ to the transmission and speed reduction gear unit. For this connection, use is often made of cross joint (also referred to as a universal joint, hook joint, or Cardan joint).

Figure 8:
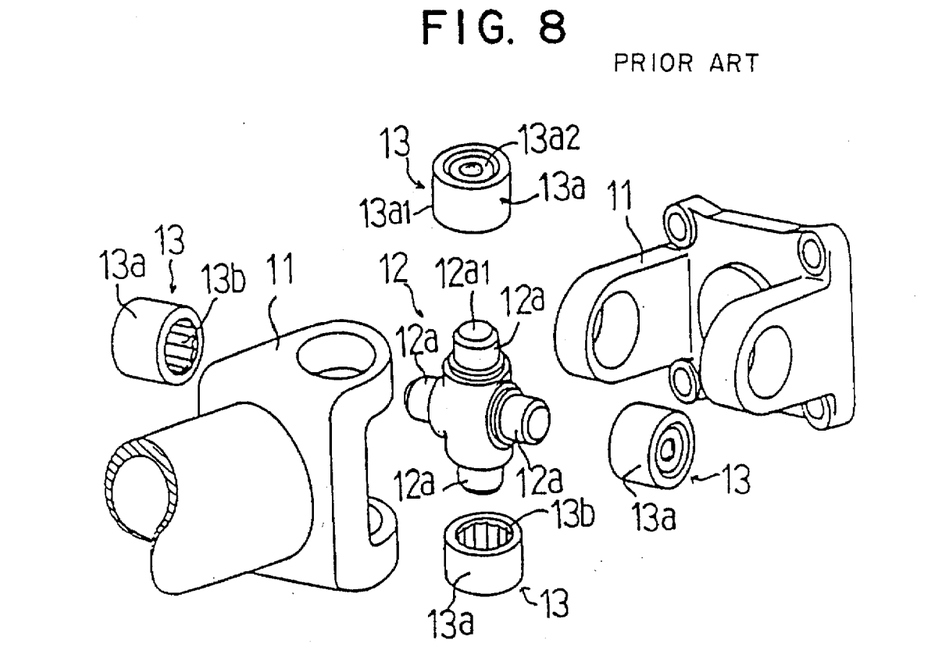
FIG. 8 is an exploded perspective view showing the common arrangement of a cross joint.

Generally, a cross joint, as shown in FIG. 8, comprises a pair of yokes 11 for a input shaft and a output shaft, a spider 12 (also referred to as a crisscross shaft or cross) having four crisscross shaft portions 12a, and four needle roller bearings 13, the four shaft portions 12a of the spider 12 being connected to the yokes 11 through the needle bearings 13. The needle roller bearing 13 comprises a cup-like outer ring 13a consisting of a cylindrical portion 13a1 and a bottom portion 13a2, and a plurality of needle rollers 13b built into an inner surface of the cylindrical portion 13a1 of the outer ring 13a, the arrangement being such that the needle rollers 13b contact the outer surface of the shaft portion 12a and an inner surface of the bottom portion 13a2 of the outer ring 13a contacts an end surface 12a1 of the shaft portion 12a.

In this connection, it is to be noted that when this kind of cross joint is rotating at an operating angle θ, a relative swing movement takes place between the shaft portion 12a of the spider 12 and the outer ring 13a (the swing angle being twice the operating angle θ, or it is 2 θ), and slide friction subject to an area of contact between the end surface 12a1 and an inner surface of the bottom portion 13a2; thus, in order to reduce the slide friction, generally, the area of contact is lubricated by grease. And in order to enhance the effect of lubrication using grease, various measures have heretofore been taken. For example, these measures include one in which radial grease holding grooves are formed in the inner surface (contact surface) of the bottom portion of the outer ring (Japanese Patent Publication No. Sho 59-1890, and U.S. Pat. No. 3,070,980), and another in which a plurality of grease holding recesses (dimples) are provided (Japanese Patent Publication NO. Sho 62-28169).

The arrangement in which radially extending grease holding grooves or dimple-like recesses utilize relative swing movement between the shaft portion of the spider and the outer ring, so as to feed the grease held in the holding grooves or dimples to the area of contact between the end surface of the shaft portion and the inner surface of the bottom portion of the outer ring. (see, e.g., Japanese Patent publication No. 62-23169).

However, in recent years, there have been cases where the propeller shaft of an automobile is installed at a reduced attaching angle (operating angle) θ (attaching error: θ=±1° or thereabouts) with the intention of providing improved vibration characteristics or simplifying the vehicle construction. In the conventional arrangement, it is sometimes difficult to sufficiently feed grease to the area of contact (because the swing angle 2θ is very small). On the other hand, it could be contemplated to cope with such miniaturization of the attaching angle θ by increasing the number of holding grooves. On the contrary, the resulting increase in the surface pressure attending the decrease in the size of the contact area may exert adverse effects such as shortage oil films. Particularly, the shaft portion of the spider and the outer ring do not always keep themselves coaxial with each other all the time when they make a swing movement. Instead they perform a complicated movement as they assume inclined positions therefore, an increase in the surface pressure tends to take place in the region on the outer diameter side of the contact area (because the edge-to-edge contact state takes place).

SUMMARY OF THE INVENTION

Accordingly, the invention is intended to solve the above problems, which attend a very small change in the attaching angle (operating angle), about lubrication in the area of contact between the end surface of the shaft portion of the spider and the inner surface of the bottom portion of the outer ring.

In a first aspect of the invention, an annular contact surface for contact with an end surface of a shaft portion of a spider included in an inner surface of a bottom surface of an outer ring is formed at a predetermined pitch angle with a plurality of substantially Y-shaped projections consisting of a pair of inclined convex regions leading to an outer diameter of the annular contact surface and a convex region due to the inclined convex regions meeting together in a region on an inner diameter side of the annular contact surface to lead to the inner diameter.

In a second aspect of the invention, an annular contact surface for contact with an end surface of a shaft portion of a spider included in an inner surface of a bottom surface of an outer ring, is formed at a predetermined pitch angle with a plurality of substantially Y-shaped recesses consisting of a pair of inclined concave regions leading to an outer diameter of the annular contact surface and a concave region due to the inclined concave regions meeting together in a region on an inner diameter side of the annular contact surface to lead to the inner diameter.

In the invention in the above arrangements, the percentage contact area of the annular contact surface is made substantially the same for regions on the inner diameter side and outer diameter side.

The angle of inclination of the inclined convex or concave region with respect to the radius line of the annular contact surface is preferably within the range of 2°–8°.

Further, the pitch angle is preferably within the range of 10°–18°.

A groove-like region communicating with both the inner diameter and outer diameter of the annular contact surface is formed between substantially Y-shaped circumferentially adjoining projections. The grease collected on the area on the inner diameter side of the inner surface of the bottom portion circulates to the area on the outer diameter side along the groove-like region. Further, the pair of inclined convex regions produce a force which causes the grease to circulate to the area on the outer diameter side when the annular contact surface and the end surface of the shaft portion of the spider perform a relative swing movement. Furthermore, since the pair of convex regions are inclined in mutually different directions, the circulating force is produced in each of the directions of the reciprocating swing movement.

Making the projections in substantial Y-shape makes it possible to suppress the decrease of the contact area owing to the formation of said groove-like regions in large number and to make the percentage contact area occupying the annular contact surface substantially the same for the regions on the inner diameter side and outer diameter side.

The percentage contact area is made substantially the same for the regions on the inner diameter side and outer diameter side, whereby the surface pressure on the contact area is made uniform, so that a high local surface pressure can hardly occur.

In the case where the uneven pattern of the contact surface is reversed, the basic function is also the same.

DETAILED DESCRIPTION OF THE PREFERRED EMBODIMENTS

Embodiments of the invention will now be described.

Figure 1A:
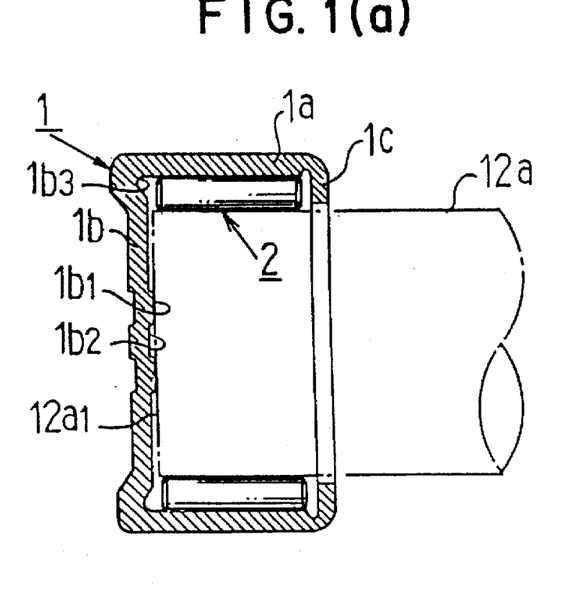
FIG. 1a is a sectional view showing a needle roller bearing according to an embodiment of the present invention and FIG. 1(b) is an enlarged sectional view of an outer ring in FIG. 1(a)

FIG. 1(a) shows a needle roller bearing for cross joints according to the present invention. This needle roller bearing comprises a cup-like outer ring 1 shown in FIG. 1(b) consisting of a cylindrical portion 1a, a bottom portion 1b, and a flange portion 1c, and a plurality of needle rollers 2 disposed around an inner surface of the cylindrical portion 1a. A shaft portion 12a of the spider 12 shown in FIG. 8 is fitted in the inner diameter of the needle rollers 2. In addition, a seal may be mounted on the opening (flange 1c) side of the outer ring 1.

Figure 1B:
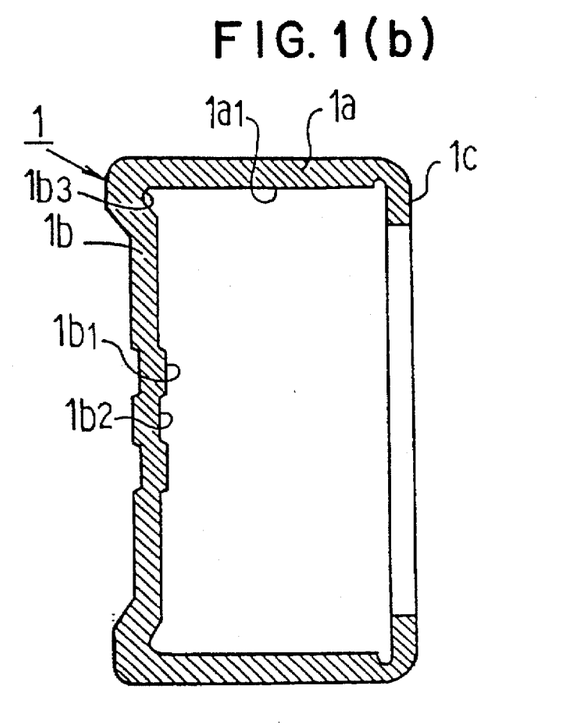

In this embodiment, the outer ring 1 is of a shell type formed by a pressing of a steel sheet blank, having a raceway surface 1a1 formed on the inner surface of the cylindrical portion 1a for the needle rollers 2 to contact, and an annular contact surface 1b1 formed on an inner surface of the bottom portion 1b for an end surface 12a1 of the shaft portion 12a to contact. Further, the inner and outer diameter sides of the annular contact surface 1b1 are formed with grease reservoirs 1b2 and 1b3, respectively.

Figure 2A:
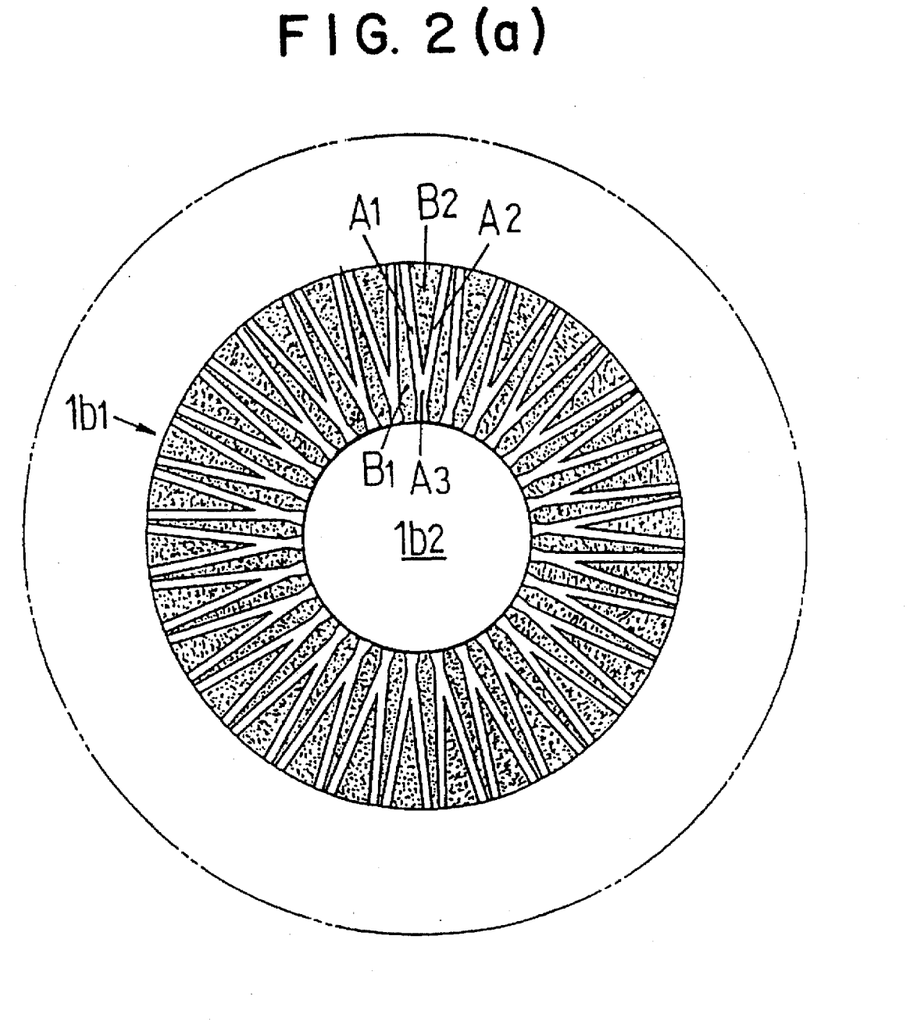
FIG. 2a is a plan view showing the contact surface of the inner surface of the bottom portion of the outer ring.

As shown enlarged in FIG. 2(a), the annular contact surface 1b1 of the bottom portion 1b is formed with an uneven pattern consisting of a number of projections (regions A1, A2, A3) and recesses B (regions B1, B2). The projections A are substantially Y-shaped regions having a given level above bottom surfaces of the recesses B (the regions B1 and B2 are of the same low level), the cross section thereof being substantially trapezoidal (see FIG. 2b). The regions A1 and A2 forming the Y's heads of each of the projections A lead to the outer diameter of the contact surface 1b1, while the region A3 forming the Y's leg leads to the inner diameter of the annular contact surface 1b1. The recesses B are the regions surrounded by the projections A, comprising the regions B1 surrounded by two circumferentially adjoining projections A, and regions B2 surrounded by the regions A1 and A2 of the projections A. The regions B1 are substantially rhombic, leading to both the inner and outer diameters of the annular contact surface 1b1, their width being gradually decreased as they extend from the inner diameter to the outer diameter. The regions B2 are substantially sectorial, leading to the outer diameter of the annular contact surface 1b1. In the annular contact surface 1b1 having such uneven pattern, the projections A contact the end surface 12a1 of the shaft portion 12a, and the recesses B serve to hold and circulate the grease.

Figure 3:
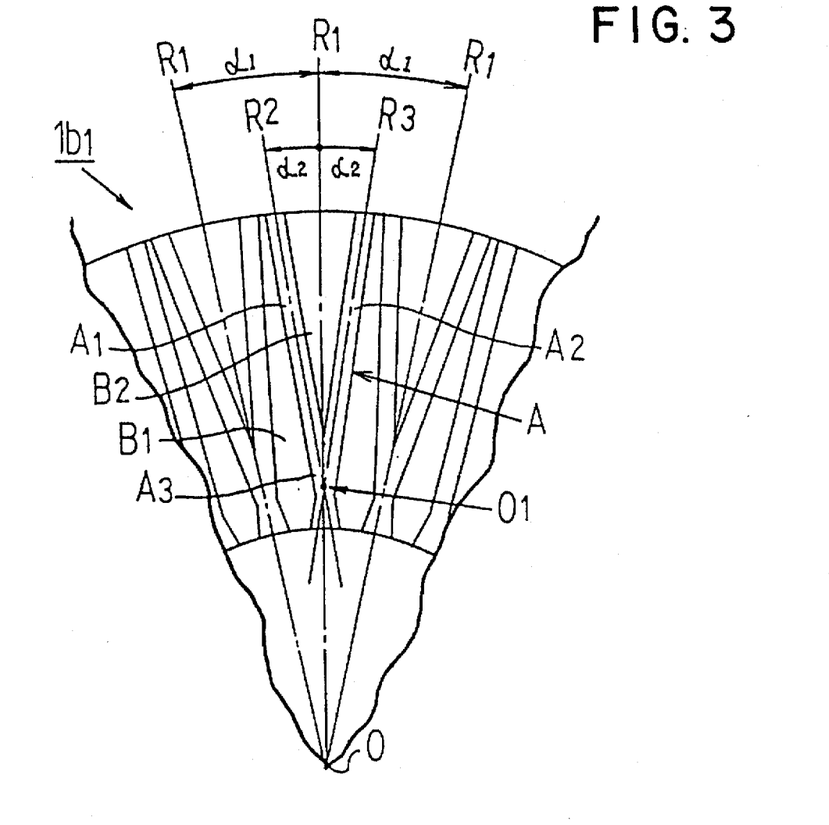
FIG. 3 is a partial enlarged plan view of the contact surface.

The pattern of the projections A is determined according to the criteria shown enlarged in FIG. 3.

First, a number of reference lines R1 are drawn at a pitch angle $\alpha_1$ radially from the center O of the inner surface of the bottom portion 1b. Next, with respect to each reference line R1, a reference line R2 having an angle of inclination $\alpha_2$ in one of the circumferential directions (e.g., in the counterclockwise direction in the same figure) and a reference line R3 having an angle of inclination $\alpha_2$ in the other circumferential direction (e.g., in the clockwise direction) are determined. And the region A1 is defined with a given width along the reference line R2 and the region A2 is defined with a given width along the reference line R3, the regions A1 and A2 meeting together in the regions on the inner diameter side of the annular contact surface 1b1 (the reference lines R2 and R3 cross each other at point 01), to define the region A3 along the reference line R1. In this manner, a number of projections A substantially in Y-shape leading to the inner and outer diameters of the annular contact surface 1b1 are defined at a pitch angle $\alpha_1$.

In this embodiment, the pitch angle $\alpha_1$ is set at 12° and the angle of inclination $\alpha_2$ is set at 3°. Therefore, the number of projections A is 30 and the total number of regions A1 and A2 is 60. Further, the regions B1 and B2 of the recesses B are 30 in number, respectively.

Figure 4:
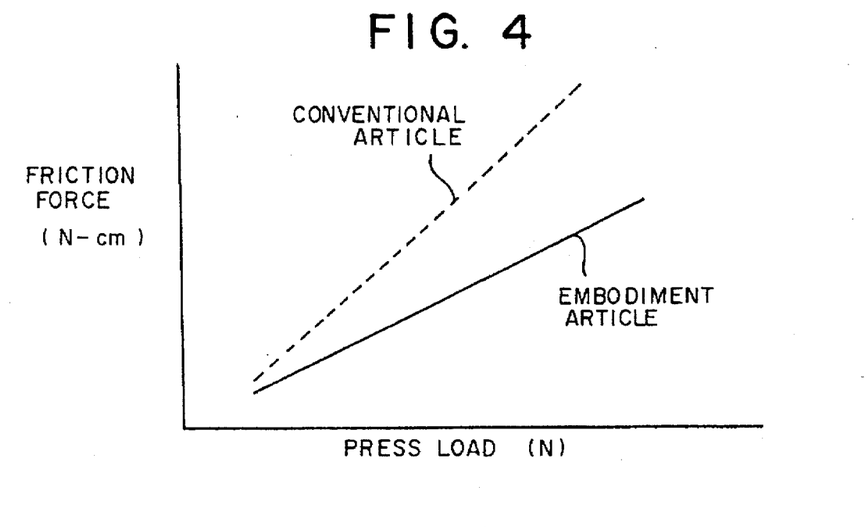
FIG. 4 is a graph showing the result of measurement of friction force.

FIG. 4 shows the results of the measurement of friction force conducted on a needle roller bearing of said arrangement (embodiment article) and a needle roller bearing for cross joints having a number of recesses (dimples) in the annular contact surface of the bottom portion of the outer ring (prior art article: the present applicant's article now in practical use). The measurement was made by fitting a shaft corresponding to a shaft portion of the spider in a test bearing and imposing a shaft load by a load cell while swinging the test bearing at a predetermined swing speed (S) and a swing angle (2θ). The same figure shows the relation between the press load (N) and the friction force (N–cm). In addition, the swing angle (2 θ) is set at a value determined in consideration of the recent tendency toward miniaturization of the attaching angle θ.

As is clear from the measurement results, the embodiment article produces a greatly reduced friction force as compared with the prior art article. It is believed that the low friction characteristic of the embodiment article is obtained by a plurality of interacting factors which follow.

(1) The groove-like regions B1 leading to both the inner and outer diameters of the annular contact surface 1b1 enhance the circulation of the grease from the reservoir 1b2 on the inner diameter side to the annular contact surface 1b1. Furthermore, since the number of groove-like regions B1 (which is 30) is greatly increased as compared with the conventional arrangement having radially extending holding grooves (for example, in U.S. Pat. No. 3,070,980, they are 8 in number), the circulation of grease to the annular contact surface 1b1 is very good and even if the swing angle (2θ) is very small, the grease can easily be fed to the area of contact between the projections A and the end surface 12a1 of the shaft portion 12a.

Figure 5A:
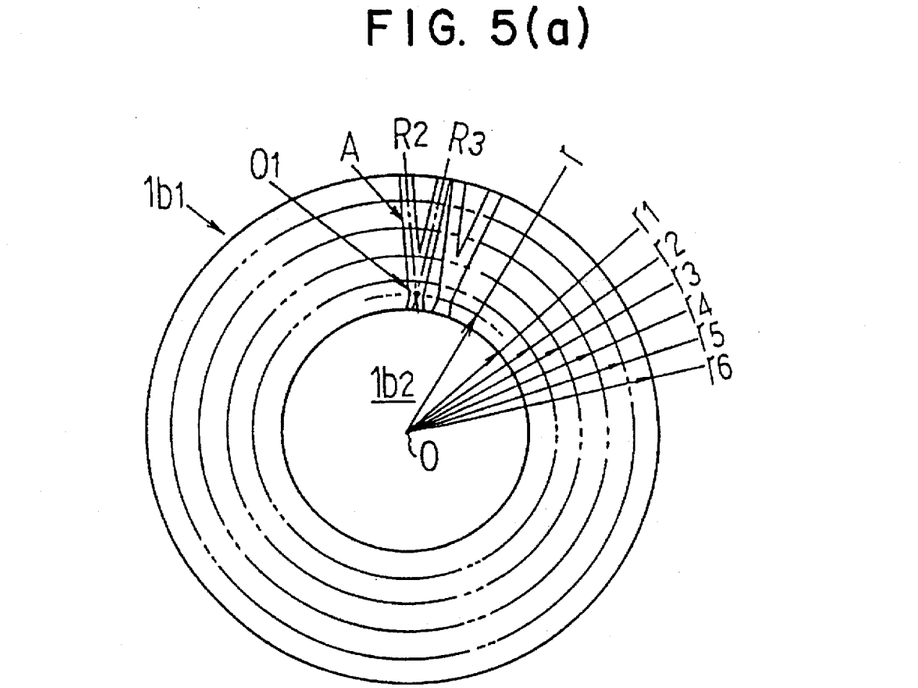
FIG. 5 shows the means for calculating the percentage contact area (percentage area of projections), and percentage area.
Figure 5B:
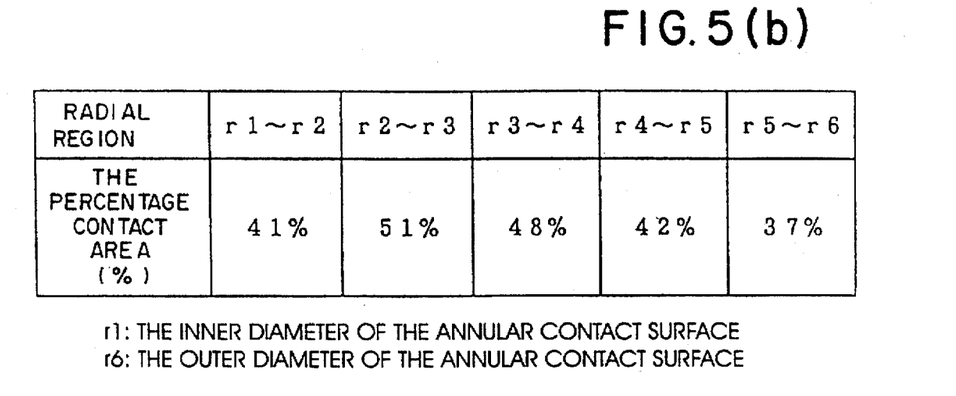

(2) On the other hand, if an increased number of groove-like regions B1 are formed on the annular contact surface 1b1, then the resulting decreased area of contact (area of the projections A) may cause an increase in the surface pressure. Particularly, the regions on the outer diameter side of the annular contact surface 1b1 tend to increase the surface pressure owing to the inclination of the shaft portion 12a or other factors. In the embodiment, the purpose of making the projections A substantially Y-shaped is to minimize the decrease of the contact area owing to providing an increased number of groove-like regions B1 and to make the percentage surface area (the percentage area of the projections A) in the annular contact surface 1b1 as the same as possible for the regions on the inner and outer diameter sides. For example, in the case where the regions A1 and A2 are set with a given width, the percentage area of the projections A in a predetermined radial regions is a value as shown in FIG. 5. In addition, the position r of the intersection 01 of the reference lines R2 and R3 is such that with respect to the outer diameter r6 of the annular contact surface 1b1, approximately r=0.52×r6. However, the position r of the intersection 01 may be optionally set in the radial regions of r1–r3 of the annular contact surface 1b1 according to the conditions including usage. In this manner, the percentage contact area in the annular contact surface (the percentage area of the projections A) is made substantially the same for the regions on the inner and outer diameter sides, whereby the surface pressure on the contact area is made uniform, so that a high local surface pressure can hardly be produced.

(3) Since the regions A1 and A2 of the projections A have a predetermined angle of inclination $\alpha_2$ with respect to the reference line R1 (radius line), there is produced a force which causes the grease in the grease reservoirs 1b2 to circulate to the outer diameter side along the groove-like regions B1 when the annular contact surface 1b1 and the end surface 12a1 of the shaft portion 12a perform a relative swing movement. Furthermore, since the angles of inclination $\alpha_2$ of the regions A1 and A2 extend in mutually different directions, this circulating force is produced in each of the directions of the reciprocating swing movement.

(4) Since the groove-like regions B1 are substantially rhombic with their width gradually decreasing from the inner diameter to the outer diameter, the grease holding force available is superior.

(5) Since the sectorial regions B2 are formed in the regions on the outer diameter side of the annular contact surface 1b1, the lubrication in the region on the outer diameter side is improved.

Figure 2B:
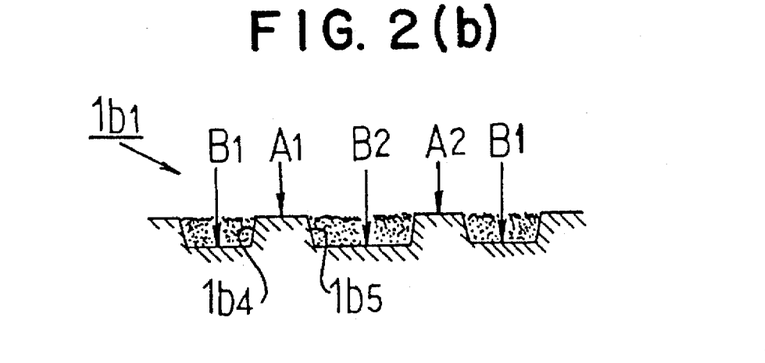
FIG. 2(b) is a partial enlarged sectional view

(6) Since the projections A are substantially rhombic in cross section and their side walls 1b4 and 1b5 are inclined, the grease held in the regions B1 and B2 can be easily led to the plane (contact area) of the projections A.

Figure 6A:
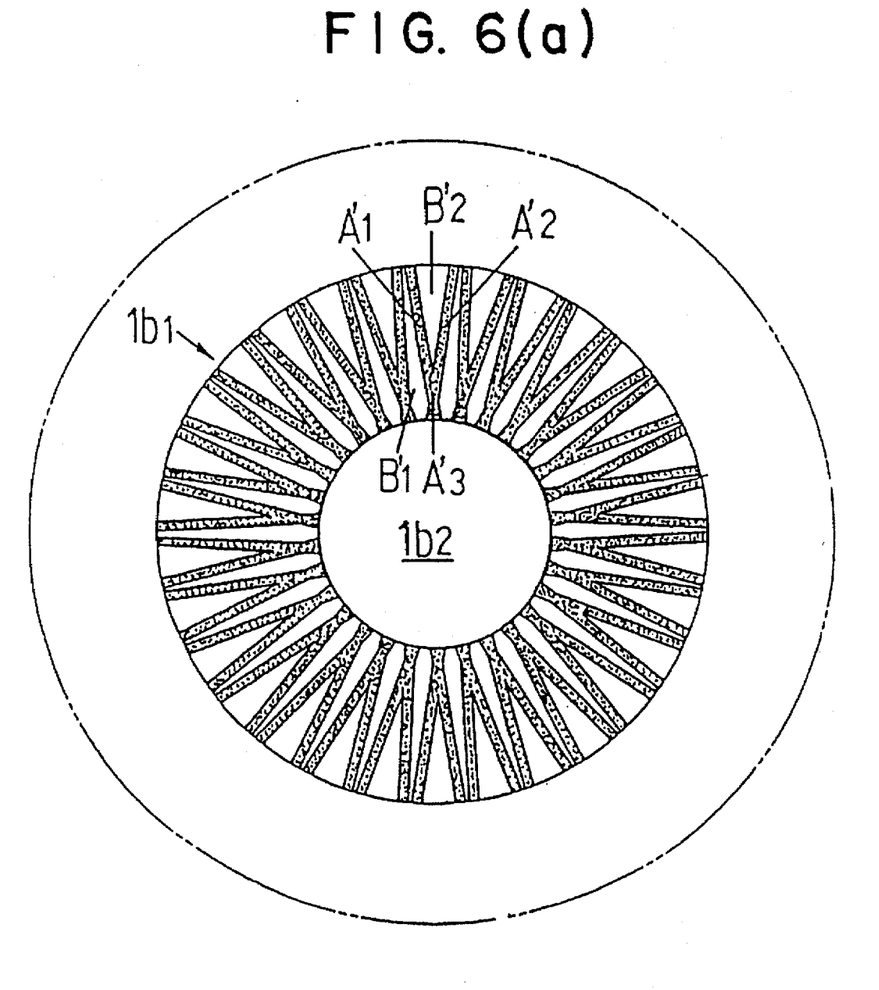
FIG. 6(a) is a plan view showing the contact surface of the inner surface of the bottom portion of the outer ring according to another embodiment of the invention.
Figure 6B:
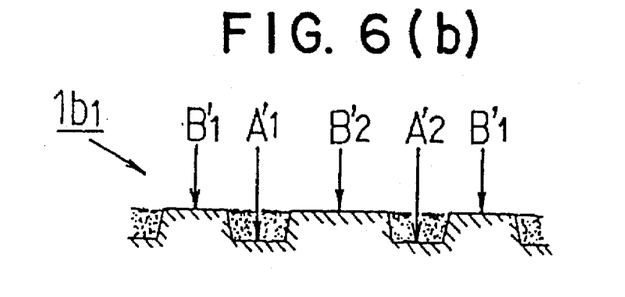
FIG. 6(b) is a partial enlarged sectional view.

In an embodiment shown in FIGS. 6(a) and 6(b) the uneven pattern of the annular contact surface 1b1 is reversed from the one shown in the preceding embodiment. That is, the substantially Y-shaped projection A (A1, A2, A3) in the preceding embodiment corresponds to a groove A' (A'1, A'2, A'3) and the recess B (B1, B2) in the preceding embodiment corresponds to a projection B' (B'1, B'2). The groove A' is a substantially Y-shaped groove having a given low level below the plane of the projection B', the cross section thereof being substantially inverted trapezoid. The regions A'1 and A'2 forming the Y's heads of the groove A' lead to the outer diameter of the annular contact surface 1b1, while the region A'3 forming the Y's leg leads to the inner diameter of the annular contact surface 1b1. The projection B' is a region delimited by the groove A', comprising a region B'1 delimited by two circumferentially adjoining grooves A' and a region B'2 delimited by the regions A'1 and A'2 of the groove A'. The regions B'1 and B'2 have the same level. The region B'1 is substantially rhombic while the region B'2 is substantially sectorial. In the annular contact surface 1b1 having such uneven pattern, the projection B' contacts the end surface 12a1 of the shaft portion 12a, while the groove A' serves to hold and circulate the grease. The pattern of the groove A' is formed according to the criteria shown in FIG. 3 in the same manner as in the projection A in the preceding embodiment.

Figure 7:
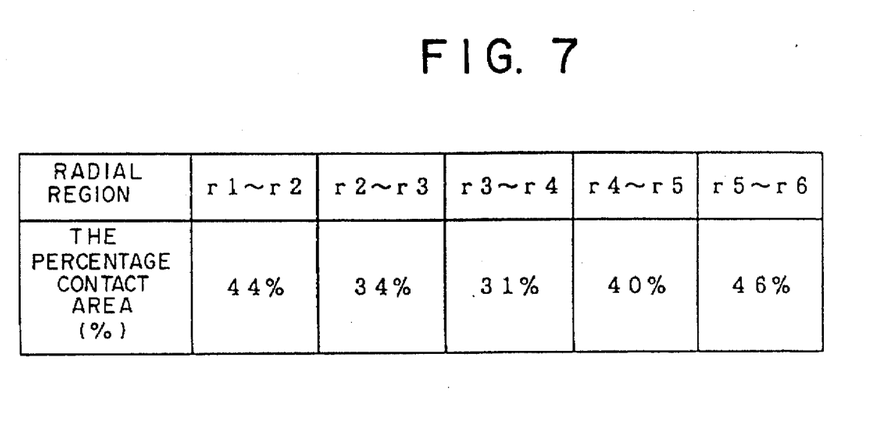
FIG. 7 is a table showing the percentage contact area (percentage area of projections) in the article shown in FIG. 6.

In this embodiment, a total of 60 groove regions are formed by the regions A'1 and A'2. Further, as shown in FIG. 7, the percentage contact area of the annular contact surface 1b1 {the percentage area of the projection B' (found by dividing the annular contact surface 1b1 into a plurality of radius regions as shown in FIG. 5)} is made substantially uniform for the regions on the inner and outer diameter sides.

The needle roller bearing of this embodiment was tested for friction force, exhibiting a low friction characteristic of the same degree as in the needle roller bearing in the preceding embodiment.

As has so far been described, according to the present invention, even in the case where the amount of the relative swing movement between the outer ring and the shaft portion of the spider is small, grease is sufficiently fed to the area of contact between the annular contact surface of the bottom portion and the end surface of the shaft portion to reduce the friction force, as compared with the prior art article, when the cross joint is rotating at a very small operating angle.

Particularly, propeller shafts for automobiles and the like show a trend toward miniaturization of the attaching angle, and the present invention exerts remarkable effects in this type of usage.

What is claimed is:

1. A bearing for a shaft of a spider of a cross joint, comprising:
   a cup-shaped outer ring having a cylindrical portion and a bottom portion, said outer ring being formed by a press working of a steel plate; and
   a plurality of needle rollers disposed along an inner surface of the cylindrical portion of the outer ring,
   wherein an inner surface of the bottom portion of the outer ring is formed centrally with a circular contact surface for contact with an end surface of the shaft, said contact surface being formed at a predetermined pitch angle with only a plurality of substantially Y-shaped projections each consisting of a pair of diverging inclined portions leading to an outer diameter of the contact surface and a leg portion formed by the inclined portions meeting together in a region on an inner diameter side of the contact surface, each of said leg portions terminating at the inner diameter.

2. A bearing for a cross joint as set forth in claim 1, wherein an angle of inclination of the inclined portions with respect to a radius line of the contact surface is in the range of 2°–8°.

3. A bearing for a shaft of a spider of a cross joint, comprising:

a cup-shaped outer ring having a cylindrical portion and a bottom portion, said outer ring being formed by a press working of a steel plate; and a plurality of needle rollers disposed along an inner surface of the cylindrical portion of the outer ring, wherein an inner surface of the bottom portion of the outer ring is formed centrally with a circular contact surface for contact with an end surface of the shaft, said contact surface being formed at a predetermined pitch angle with only a plurality of substantially Y-shaped recesses each consisting of a pair of diverging inclined portions leading to an outer diameter of the contact surface and a leg portion formed by the inclined portions meeting together in a region on an inner diameter side of the contact surface, each of said leg portions terminating at the inner diameter.

4. A bearing for a cross joint as set forth in claim 1 or 3, wherein a percentage contact area of the contact surface is substantially the same for regions on the inner diameter side and outer diameter side of the contact surface.

5. A bearing for a cross joint as set for in claim 1 or 3, wherein the pitch angle is in the range of 10°–18°.

6. A bearing for a cross joint as set forth in claim 3, wherein an angle of inclination of the inclined portions with respect to a radius line of the contact surface is in the range of 2°–8°.

* * * * *